United States Patent
Matsushita et al.

(10) Patent No.: US 11,711,151 B2
(45) Date of Patent: Jul. 25, 2023

(54) OPTICAL TRANSMISSION SYSTEM AND COMPENSATION METHOD

(71) Applicant: NIPPON TELEGRAPH AND TELEPHONE CORPORATION, Tokyo (JP)

(72) Inventors: Asuka Matsushita, Musashino (JP); Masanori Nakamura, Musashino (JP); Kengo Horikoshi, Musashino (JP); Shoichiro Kuwahara, Musashino (JP); Yoshiaki Kisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/595,161

(22) PCT Filed: May 23, 2019

(86) PCT No.: PCT/JP2019/020441
§ 371 (c)(1),
(2) Date: Nov. 10, 2021

(87) PCT Pub. No.: WO2020/235078
PCT Pub. Date: Nov. 26, 2020

(65) Prior Publication Data
US 2022/0216923 A1    Jul. 7, 2022

(51) Int. Cl.
*H04B 10/61* (2013.01)

(52) U.S. Cl.
CPC .............. *H04B 10/6163* (2013.01)

(58) Field of Classification Search
None
See application file for complete search history.

(56) References Cited

U.S. PATENT DOCUMENTS

2017/0078027 A1* 3/2017 Okabe .................. H04B 10/548
2020/0036440 A1   1/2020 Yamagishi et al.

FOREIGN PATENT DOCUMENTS

| JP | 2017059962 A | 3/2017 |
| JP | 6319487 B1 | 5/2018 |
| JP | 201947261 A | 3/2019 |
| WO | WO-2019049616 A1 | 3/2019 |

* cited by examiner

Primary Examiner — Darren E Wolf
(74) Attorney, Agent, or Firm — Harness, Dickey & Pierce, P.L.C.

(57) ABSTRACT

An optical transmission system according to an embodiment includes: an optical transmission unit which modulates an optical signal into which a known signal is inserted and transmits the optical signal; and an optical reception unit which receives the optical signal from the optical transmission unit, wherein the optical reception unit includes: an optical receiver which performs coherent detection of a reception signal of the optical signal received from the optical transmission unit; a receiver transfer function estimation section which estimates a nonlinear response transfer function of the optical receiver based on the known signal included in the reception signal after the detection by the optical receiver; and a receiver compensation section which compensates nonlinear distortion of the reception signal after the detection based on the nonlinear response transfer function which the receiver transfer function estimation section estimates.

8 Claims, 9 Drawing Sheets

OPTICAL TRANSMISSION SYSTEM AND COMPENSATION METHOD

CROSS-REFERENCE TO RELATED APPLICATIONS

This application is a 371 U.S. National Phase of International Application No. PCT/JP2019/020441 filed on May 23, 2019. The entire disclosures of the above applications are incorporated herein by reference.

TECHNICAL FIELD

The present invention relates to a technique which estimates or compensates a transmission characteristic of an optical transceiver in an optical transmission system.

BACKGROUND ART

To cope with the increase in communication traffic, there has been a demand for an optical transceiver which can perform transmission and reception at a high speed and with a large capacity. An optical transceiver which has been introduced recently uses a digital coherent technology which combines digital signal processing (DSP) and coherent detection with each other.

In an optical transceiver of 100 Gb/s per channel, a baud rate and a modulation system adopt, for example, 32 Gbaud polarization division multiplexing-quadrature phase shift keying (PDM-QPSK). An optical transmitter generates a PDM-QPSK optical signal by modulating linear polarized lights (an X polarized wave and a Y polarized wave) which are orthogonal to each other by a baseband signal of QPSK respectively. An optical receiver converts an optical signal into a baseband signal by performing coherent detection of a received optical signal and a local oscillation light, and regenerates transmission data by demodulating QPSK by digital signal processing (DSP).

To increase a transmission capacity per channel, in an optical transceiver of 400 Gb/s, a baud rate and a modulation system adopt 64 Gbaud polarization division multiplexing-16 quadrature amplitude modulation (PDM-16QAM) or 43 Gbaud PDM-64QAM. In this manner, in future optical transceivers, to increase a transmission capacity per channel, the increase in baud rate and multi-valuing of a modulation system progress.

Along with the increase in baud rate and the multi-valuing of the modulation system, the optical transceiver is required to possess a favorable transmission characteristic in a broad band. The transmission characteristic of a transmission signal in the optical transceiver is expressed by a transfer function. In general, an optical transceiver has a plurality of lanes (an in-phase component XI of an X polarized wave, a quadrature phase component XQ of the X polarized wave, an in-phase component YI of a Y polarized wave, and a quadrature phase component YQ of the Y polarized wave). The difference in transfer function between the lanes induces the deterioration of an overall transmission characteristic of the system and hence, it is also requested to sufficiently suppress the difference in transfer function between the lanes. When a frequency characteristic of the transfer function of the optical transceiver is insufficient or when the difference in transfer function between the lanes exists, for example, it is necessary to compensate the transmission characteristic or the difference in transfer function between the lanes by DSP. In view of such a circumstance, conventionally, there has been proposed a method which estimates or compensates a transmission characteristic of an optical transceiver (for example, see Patent Literature 1).

CITATION LIST

Patent Literature

Patent Literature 1: Japanese Patent No. 6319487

SUMMARY OF THE INVENTION

Technical Problem

In particular, an optical receiver where DSP is required to possess real time property is constituted of an optical 90-degree hybrid, a balanced photo diode (BPD) and a trans-impedance amplifier (TIA). In the optical receiver, a signal obtained by photoelectric conversion is inputted to an analog to digital converter (ADC). In such an optical receiver, a nonlinear response caused by the TIA or the ADC becomes a factor which deteriorates quality of a signal. However, in the conventional method, with respect to distortion of a transmission characteristic generated in the optical receiver, there exists a drawback that, although distortion caused by a linear response in the internal configuration can be compensated, distortion caused by a nonlinear response in the internal configuration cannot be compensated.

The present invention has been made in view of the above-mentioned circumstances, and it is an object of the present invention to provide a technique which enables the estimation of a nonlinear response caused by the internal configuration of an optical receiver or the compensation for distortion of a transmission characteristic caused by such a nonlinear response.

Means for Solving the Problem

According to one aspect of the present invention, there is provided an optical transmission system which includes: an optical transmission unit which modulates an optical signal into which a known signal is inserted and transmits the optical signal; and an optical reception unit which receives the optical signal from the optical transmission unit, wherein the optical reception unit includes: an optical receiver which performs coherent detection of a reception signal of the optical signal received from the optical transmission unit; a receiver transfer function estimation section which estimates a nonlinear response transfer function of the optical receiver based on the known signal included in the reception signal after the detection by the optical receiver; and a receiver compensation section which compensates nonlinear distortion of the optical signal after the detection based on the nonlinear response transfer function which the receiver transfer function estimation section estimates.

According to another aspect of the present invention, in the above-mentioned optical transmission system, the receiver transfer function estimation section estimates a first transfer function of the optical receiver based on an output signal of the optical receiver with respect to input of an amplified spontaneous emission (ASE) signal, the optical transmission unit further includes a transmitter transfer function estimation section which estimates a transfer function of the optical transmitter which modulates the optical signal based on a reception signal which includes a known signal and the first transfer function, and the receiver transfer function estimation section estimates a second transfer function of the optical receiver based on a reception signal which includes the known signal and in which distortion caused by the optical transmitter is compensated and the transfer function of the optical transmitter, and the receiver compensation section compensates nonlinear distortion of the optical signal after the detection based on the second transfer function.

According to another aspect of the present invention, in the above-mentioned optical transmission system, the receiver transfer function estimation section further estimates a linear response transfer function of the optical receiver based on the optical signal after the detection by the optical receiver, and the receiver compensation section compensates linear distortion of the optical signal after the detection based on the linear response transfer function which the receiver transfer function estimation section estimates in addition to compensation for the nonlinear distortion.

According to another aspect of the present invention, in the above-mentioned optical transmission system, the receiver compensation section compensates the linear distortion and the nonlinear distortion of the reception signal in an order opposite to an order that the reception signal receives the linear distortion and the nonlinear distortion in the optical receiver.

According to another aspect of the present invention, in the above-mentioned optical transmission system, the receiver compensation section compensates nonlinear distortion of the reception signal by using a Volterra filter.

According to another aspect of the present invention, in the above-mentioned optical transmission system, the receiver compensation section compensates nonlinear distortion of the reception signal by using some of coefficients of the Volterra filter.

According to another aspect of the present invention, in the above-mentioned optical transmission system, the receiver transfer function estimation section estimates the first transfer function and the second transfer function by using a component which corresponds to intensity of band dependency or a pattern effect of the nonlinear response out of reference signal components which form the Volterra filter.

According to another aspect of the present invention, there is provided a compensation method of a reception signal in an optical transmission system which includes an optical transmission unit which modulates an optical signal into which a known signal is inserted and transmits the optical signal, and an optical reception unit which receives the optical signal from the optical transmission unit, wherein the compensation method includes the steps, by the optical reception unit, of: performing coherent detection of an optical signal received from the optical transmission unit by an optical receiver; estimating a nonlinear response transfer function of the optical receiver based on the known signal included in the reception signal after the detection by the optical receiver; and compensating nonlinear distortion of the optical signal after the detection based on the estimated nonlinear response transfer function.

Effects of the Invention

According to the present invention, it is possible to estimate a nonlinear response caused by the internal configuration of the optical receiver and to compensate distortion of a transmission characteristic caused by the nonlinear response.

DESCRIPTION OF EMBODIMENTS

Figure 1:
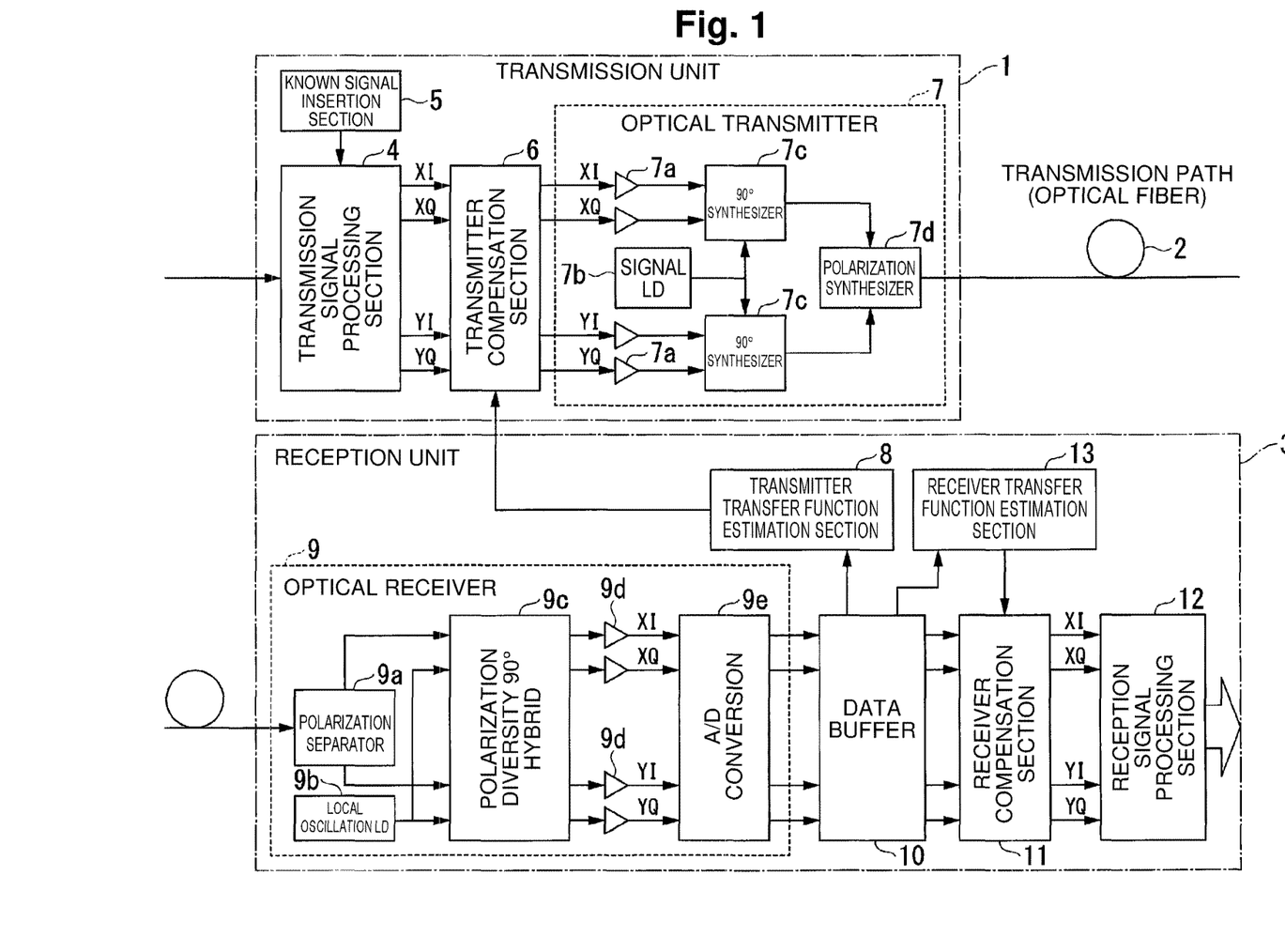
FIG. 1 is a view showing a specific example of the system configuration of an optical transmission system according to an embodiment of the present invention.

FIG. 1 is a view showing a specific example of the system configuration of an optical transmission system 100 according to an embodiment of the present invention. The optical transmission system 100 is formed of an optical transmission unit 1, an optical reception unit 3 which receives an optical signal from the optical transmission unit 1 through a transmission path 2. The transmission path 2 is formed of, for example, an optical fiber and an optical amplifier.

The optical transmission unit 1 includes a transmission signal processing section 4, a known signal insertion section 5, a transmitter compensation section 6, and an optical transmitter 7. Some or all of the transmission signal processing section 4, the known signal insertion section 5 and the transmitter compensation section 6 are formed of hardware such as an application specific integrated circuit (ASIC) or a field programmable gate array (FPGA). Some or all of functions of these sections may be formed as software which functions when a processor such as a central processing unit (CPU) executes a program stored in a memory section.

In the known signal insertion section 5, sequences of known signals are respectively inserted into modulation target signal sequences such as an XI lane, an XQ lane, a YI lane, and a YQ lane which the transmission signal processing section 4 generates. The sequence of known signals may be a signal sequence of any pattern provided that the sequence of known signals may be shared in common by the optical transmission unit 1 and the optical reception unit 3 in advance.

The transmission signal processing section 4 generates frame data based on a transmission data sequence. The frame data is a signal sequence (modulation target signal sequence) for applying modulation processing in the optical transmitter 7. The transmission signal processing section 4 transmits frame data in which the known signal sequence is inserted to the transmitter compensation section 6.

The transmitter compensation section 6 acquires an estimation result of a transfer function of the optical transmitter 7 from a transmitter transfer function estimation section 8 of the optical reception unit 3 described later. The transmitter compensation section 6 compensates transfer functions of the XI lane, the XQ lane, the YI lane, and the YQ lane and the difference in transfer function between the lanes of the optical transmitter 7 based on the estimation result. For example, the transmitter compensation section 6 may be formed of a digital filter such as a finite impulse response (FIR) filter, or may be formed of an analog filter. The transmitter compensation section 6 may have a function of compensating delay time differences between four lanes.

The optical transmitter 7 generates an optical signal of a modulation target signal sequence by modulating linear polarized lights orthogonal to each other based on the compensated frame data. The optical transmitter 7 includes a driver amplifier 7a, a laser module 7b (signal LD), a 90° synthesizer 7c, and a polarization synthesizer 7d. The driver amplifier 7a amplifies an electric signal of the compensated frame data to an appropriate amplitude, and transmits the amplified electric signal to the 90° synthesizer 7c. The 90° synthesizer 7c is a Mach-Zehnder vector modulator, and separates a continuous wave (CW) light of a linear polarized light transmitted from the laser module 7b into linear polarized lights orthogonal to each other. By modulating the respective linear polarized lights based on frame data, optical signals of modulation target signal sequences are generated. An optical signal formed of a horizontally polarized wave and an optical signal formed of a vertically polarized wave are synthesized by the polarization synthesizer 7d, and a synthesized polarized light is supplied to the optical reception unit 3 through the transmission path 2.

The optical reception unit 3 includes an optical receiver 9, a data buffer 10, a receiver compensation section 11, a reception signal processing section 12, a receiver transfer function estimation section 13, and the transmitter transfer function estimation section 8. In FIG. 1, the transmitter compensation section 6 and the receiver compensation section 11 are expressed as individual blocks. However, the transmitter compensation section 6 may be a part of the transmission signal processing section 4, and the receiver compensation section 11 may be a part of the reception signal processing section 12.

The optical receiver 9 is called an optical coherent receiver in general, and has a function of detecting an I component and a Q component with respect to an X polarized wave and a Y polarized wave which are obtained by applying polarization division multiplexing to an optical signal inputted from the transmission path 2. More specifically, the optical receiver 9 includes a polarization separator 9a, a laser module 9b (local oscillation LD), a polarization diversity 90° hybrid 9c, a photo diode (PD) (not shown), trans-impedance amplifier (TIA) 9d, and an A/D converter 9e.

The laser module 9b transmits a CW light which is a linear polarized light to the polarization diversity 90° hybrid 9c. The polarization diversity 90° hybrid 9c generates interference between the received optical signal and the CW light, and a photo diode performs a photoelectric conversion of the interference light. The TIA 9d converts the current signal to a voltage signal, and the A/D converter 9e performs A/D conversion of the voltage signal. Accordingly, the received optical signal is converted into a digital signal of a baseband.

Some or all of the A/D converter 9e of the optical receiver 9, the data buffer 10, the receiver compensation section 11, the reception signal processing section 12, the receiver transfer function estimation section 13, and the transmitter transfer function estimation section 8 are formed of hardware such as an ASIC or an FPGA. Some or all of functions of these sections may be formed as software which functions when a processor such as a CPU executes a program stored in a memory section.

The receiver transfer function estimation section 13 and the transmitter transfer function estimation section 8 may be formed as external devices independent from the optical transceiver, for example, as a PC or a part of a device corresponding to the PC. The reception signal processing section 12 may have substantially the same function as the receiver transfer function estimation section 13 and the transmitter transfer function estimation section 8. In this case, the receiver transfer function estimation section 13 and the transmitter transfer function estimation section 8 may be formed as parts of the reception signal processing section 12.

The data buffer 10 is formed of a memory circuit (RAM) in general, and temporarily stores data obtained by applying A/D conversion to signals received by the optical receiver 9. Data stored in the data buffer 10 is sequentially transmitted to the receiver compensation section 11 and the reception signal processing section 12 on the post—stage. It is also possible that the transfer function estimation section 13 and the transmitter transfer function estimation section 8 acquire these data. It is also possible that the receiver transfer function estimation section 13 and the transmitter transfer function estimation section 8 directly acquire data to which A/D conversion is applied in real time without using the data buffer 10. Note that all examples described using digital data of the data buffer 10 include a method where the receiver transfer function estimation section 13 and the transmitter transfer function estimation section 8 directly acquire reception data in real time.

The receiver compensation section 11 acquires an estimation result of a true transfer function of the optical receiver 9 from the receiver transfer function estimation section 13, and the receiver compensation section 11 compensates transfer functions of an XI lane, an XQ lane, a YI lane, and a YQ lane of the optical receiver 9 and differences in transfer function between the lanes based on an estimation result. The receiver compensation section 11 is formed of a digital filter such as a Volterra filter. The receiver compensation section 11 may have a function of compensating delay time differences between four lanes individually.

A digital signal is inputted to the reception signal processing section 12 from the receiver compensation section 11. In the transmission path 2, waveform distortion is generated in an optical signal due to chromatic dispersion, polarization mode dispersion, polarization fluctuation or a nonlinear optical effect, for example. The reception signal processing section 12 compensates waveform distortion generated in the transmission path 2. The reception signal processing section 12 compensates difference between frequency of a light of the laser module 7b of the optical transmitter 7 and frequency of a local oscillation light of the laser module 9b of the optical receiver 9. The reception signal processing section 12 compensates phase noise corresponding to a line width of the light of the laser module 7b of the optical transmitter 7 and a line width of the local oscillation light of the laser module 9b of the optical receiver 9.

The receiver transfer function estimation section 13 has a first estimation function of estimating a temporary transfer function (first transfer function) or a temporary inverse transfer function of the optical receiver 9, and a second estimation function of estimating a true transfer function (second transfer function) or a true inverse transfer function of the optical receiver 9. Hereinafter, an estimation result obtained by the first estimation function is referred to as a first estimation result, and an estimation result obtained by the second estimation function is referred to as a second estimation result.

[First Estimation Function]

The receiver transfer function estimation section 13 estimates a temporary transfer function or an inverse transfer function of the optical receiver 9 based on digital data which the optical reception unit 3 acquires when an amplified spontaneous emission (ASE) signal which corresponds to a white noise is inputted to an input end of the optical receiver 9. The ASE signal can be generated from an optical amplifier. In a case where only the ASE signal is outputted, the optical amplifier is used without any input. Although the optical amplifier may be separately prepared, the optical amplifier on the transmission path 2 can also be used. A spectrum (frequency characteristic) of the ASE signal is uniform and hence, a frequency characteristic can be acquired through the ASE signal. Accordingly, the frequency characteristic can be estimated by acquiring data stored in the data buffer 10 by the receiver transfer function estimation section 13 in a state where the ASE signal is inputted. The frequency characteristic can be estimated for respective lanes.

A frequency characteristic can be estimated by applying Fourier transform to digital data, and a transfer function is obtained as a specific estimation result. As a technique for obtaining an inverse transfer function, besides the calculation of an inverse number, there is a method which obtains a solution of an adaptive filter. In general, as the method for obtaining the solution of an adaptive filter, a method which obtains a Wiener solution, and a method which obtains the solution of the adaptive filter by a least mean square (LMS) algorithm or a recursive least square (RLS) algorithm are named. A transfer function does not change relatively in time and hence, "adaptive" does not mean correspondence in time. Hereinafter, "adaptive" means adaptation to a feedback circuit for obtaining a convergent solution. In the above-mentioned description, an ASE signal is used. However, a test signal is not limited to an ASE signal and any test signal can be used provided that the spectrum of the signal is known.

[Second Estimation Function]

The receiver transfer function estimation section 13 estimates a true transfer function or a true inverse transfer function of the optical receiver 9 based on first digital data which the optical reception unit 3 acquires when a first known signal is transmitted from the optical transmission unit 1 to the optical reception unit 3 and a transfer function or an inverse transfer function of the optical transmitter 7. For example, the receiver transfer function estimation section 13 estimates an inverse transfer function of the optical receiver 9 by using the adaptive filter. For example, the adaptive filter is a filter based on an LMS algorithm or a filter based on an RLS algorithm. Also in this case, the estimation can be performed for respective lanes. The transfer function or the inverse transfer function of the optical transmitter 7 can be estimated by the transmitter transfer function estimation section 8.

The transmitter transfer function estimation section 8 estimates a transfer function or an inverse transfer function of the optical transmitter 7 based on second digital data which the optical reception unit 3 acquires when a second known signal is transmitted from the optical transmission unit 1 to the optical reception unit 3 and a temporary transfer function or a temporary inverse transfer function of the optical receiver 9. For example, the transmitter transfer function estimation section 8 estimates a transfer function of the optical transmitter 7 by using an adaptive filter. The adaptive filter is, for example, a filter based on an LMS algorithm or a filter based on an RMS algorithm.

Figure 2:
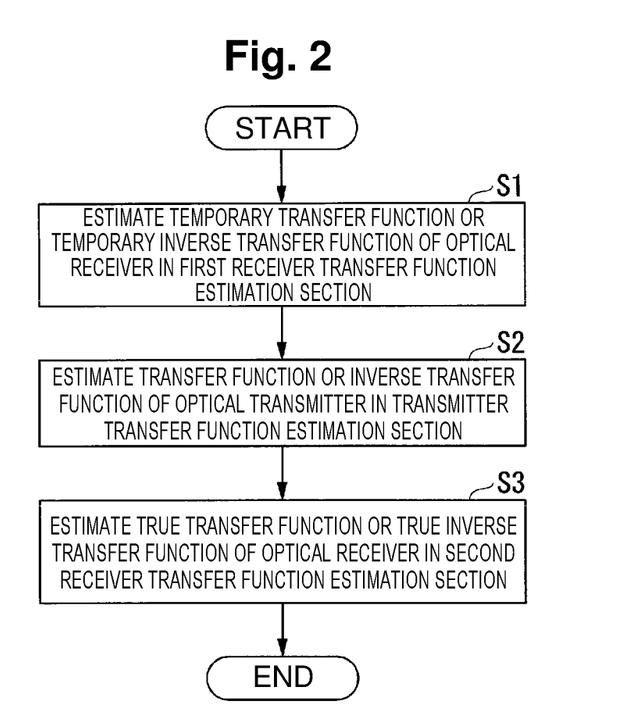
FIG. 2 is a flowchart showing a specific example of a method of estimating optical transmission characteristics of an optical transmitter and an optical receiver in the optical transmission system according to the embodiment of the present invention.

FIG. 2 is a flowchart showing a specific example of a method of estimating optical transmission characteristics of the optical transmitter 7 and the optical receiver 9 in the optical transmission system 100 according to the embodiment of the present invention. First, the receiver transfer function estimation section 13 estimates a temporary transfer function or a temporary inverse transfer function of the optical receiver 9 by the first estimation function (step S1). Next, the transmitter transfer function estimation section 8 estimates a transfer function or an inverse transfer function of the optical transmitter 7 (step S2). Next, the receiver transfer function estimation section 13 estimates a true transfer function or a true inverse transfer function of the optical receiver 9 by the second estimation function (step S3). Hereinafter, the detailed operations of the respective steps are described in detail.

Figure 3:
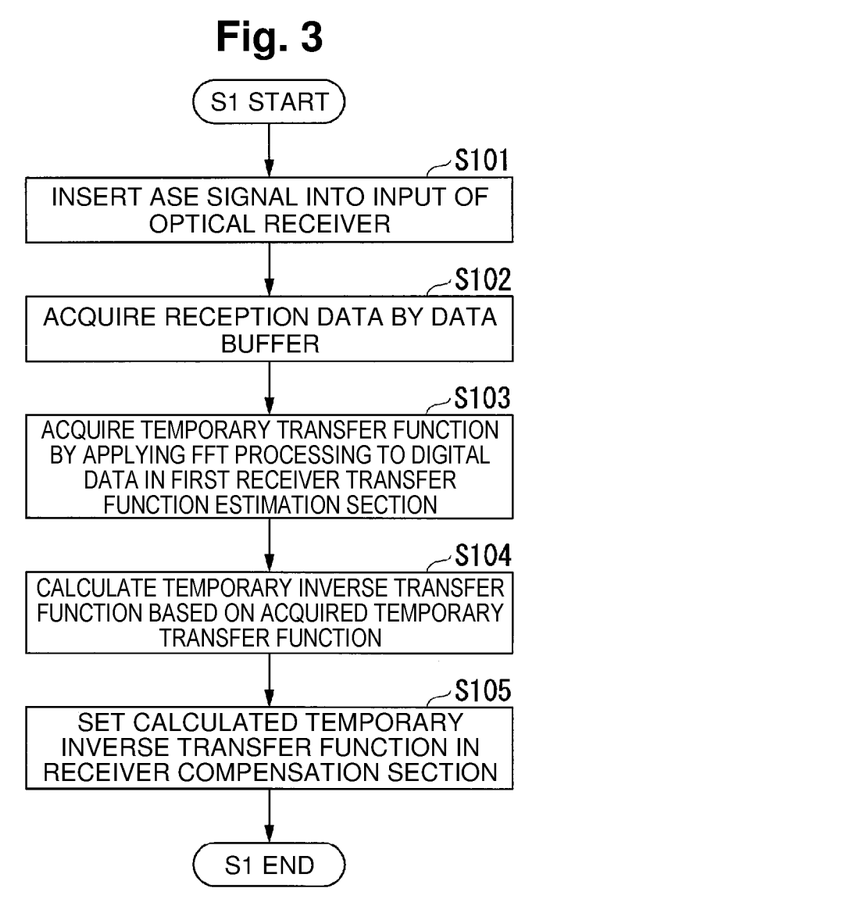
FIG. 3 is a flowchart showing a specific example of a method of estimating a temporary transfer function of the optical receiver in the optical transmission system according to the embodiment of the present invention.

FIG. 3 is a flowchart showing a specific example of a method of estimating a temporary transfer function of the optical receiver 9 in the optical transmission system 100 according to the embodiment of the present invention. First, an ASE signal is inserted into an input of the optical receiver 9 (step S101). It is known that a spectrum of the ASE signal is uniform and hence, a frequency characteristic can be acquired through insertion of the ASE signal. Next, in a state where the ASE signal is inputted, the data buffer 10 acquires reception data (step S102). Next, the receiver transfer function estimation section 13 acquires digital data from the data buffer 10 and performs FFT processing on the digital data thus acquiring a temporary transfer function (step S103). Next, a temporary inverse transfer function is calculated based on the acquired temporary transfer function (step S104). Next, the calculated temporary inverse transfer function is set in the receiver compensation section 11 (step S105).

Figure 4:
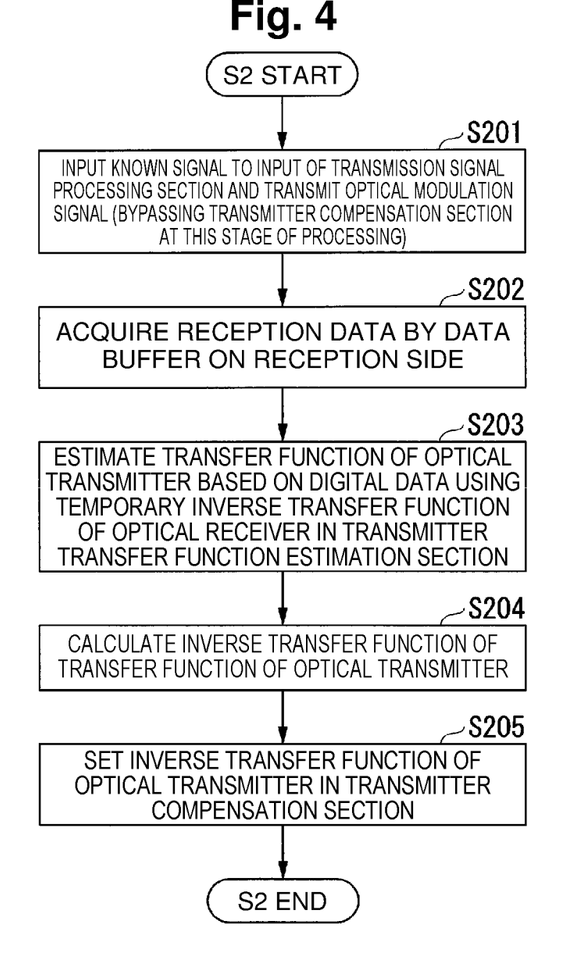
FIG. 4 is a flowchart showing a specific example of a method of estimating a transfer function or an inverse transfer function of the optical transmitter in the optical transmission system according to the embodiment of the present invention.

FIG. 4 is a flowchart showing a specific example of a method of estimating a transfer function or an inverse transfer function of the optical transmitter 7 in the optical transmission system 100 according to the embodiment of the present invention. First, a known signal is inputted to an input of the transmission signal processing section 4, and an optical modulation signal is transmitted from the optical transmitter 7 (step S201). At this stage of operation, the transmitter compensation section 6 is bypassed. Next, reception data is acquired by the data buffer 10 on a reception side (step S202).

Next, the transmitter transfer function estimation section 8 acquires digital data from the data buffer 10. The transmitter transfer function estimation section 8 extracts the known signal from the acquired digital data. The various transmission characteristic compensations and the optical receiver compensation are performed on the extracted known signal. The optical receiver compensation is performed by using the temporary inverse transfer function of the optical receiver 9 estimated in step S1. The known signal on which various transmission characteristic compensations and the optical receiver compensation are performed still includes an influence of the transfer function of the optical transmitter 7 and hence, the transfer function of the optical transmitter 7 can be estimated based on the known signal (step S203).

More specifically, with respect to the known signal on which the above-mentioned various compensations are performed, an FIR filter in which an inverse characteristic of the known signal is applied to the known signal is adapted as an adaptive filter, and the inverse characteristic is again corrected such that a square of a differential between an output of the FIR filter and the known signal becomes minimum. By performing such processing, a filter coefficient of the FIR filter which forms the adaptive filter can be obtained as a time response of an inverse transfer function (step S204). The inverse transfer function of the optical transmitter 7 can be directly obtained by an adaptive equalization circuit and hence, step S203 and step S204 can be processed integrally in such a case.

Next, an estimated inverse transfer function of the optical transmitter 7 is set in the transmitter compensation section 6 (step S205). A setting method is equal to the setting method described in step S105. At this stage of processing, as described previously, setting of the estimated inverse transfer function can be independently performed with respect to the respective lanes XI, XQ, YI, and YQ. In this case, the delay difference between the lanes can also be extracted and compensated.

Figure 5:
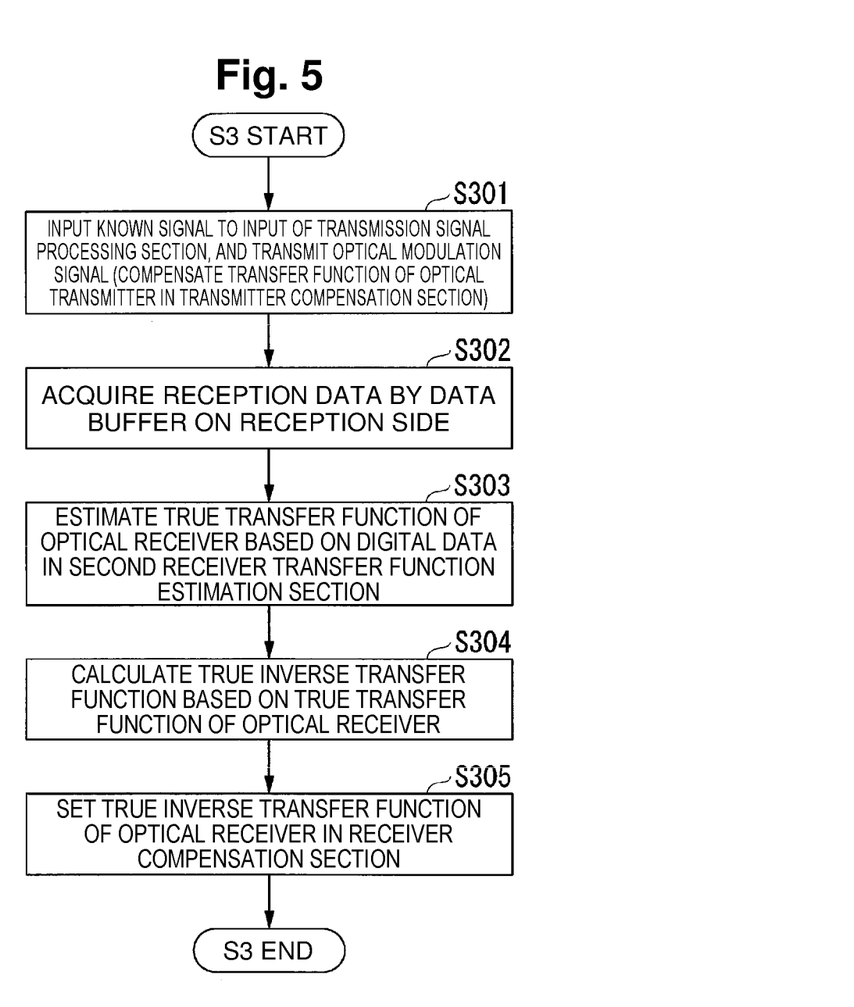
FIG. 5 is a flowchart showing a specific example of a method of estimating a true transfer function or a true inverse transfer function of the optical receiver in the optical transmission system according to the embodiment of the present invention.

FIG. 5 is a flowchart showing a specific example of a method of estimating a true transfer function or a true inverse transfer function of the optical receiver 9 in the optical transmission system 100 according to the embodiment of the present invention. First, a known signal is inputted to an input of the transmission signal processing section 4, and an optical modulation signal is transmitted from the optical transmitter 7 of the optical transmission unit 1 to the optical reception unit 3 (S301). At this stage of processing, the inverse transfer function of the optical transmitter 7 estimated in step S2 shown in FIG. 2 is set in the transmitter compensation section 6 thus compensating the transmission characteristic of the optical transmitter 7.

Next, reception data is acquired by the data buffer 10 on a reception side (step S302). The receiver transfer function estimation section 13 acquires digital data from the data buffer 10. The receiver transfer function estimation section 13 extracts a known signal from the acquired digital data. The extracted known signal is supplied to the Volterra filter which forms an adaptive filter. On the other hand, the extracted known signal is compared with an output of the adaptive filter after chromatic dispersion, frequency offset, polarization dispersion or polarization rotation, a clock phase, and a phase noise which are estimated as transmission path distortion with respect to the known signal are added to the known signal. Addition amounts of chromatic dispersion, frequency offset, polarization dispersion or polarization rotation, the clock phase, and the phase noise are estimated at various estimation blocks not shown in the drawings based on a state of the known signal.

It is considered that the transfer function of the optical transmitter 7 is compensated by the transmitter compensation section 6 in an output of the adaptive filter. Accordingly, when the transfer function of the optical receiver 9 is further compensated by the adaptive filter in this output, only an influence of transmission path distortion remains in an output of the adaptive filter. Accordingly, by comparing this signal with the known signal to which transmission path distortion is added, the true transfer function of the optical receiver 9 can be estimated (step S303).

More specifically, a differential (square error) between an output of the adaptive filter and the known signal to which transmission path distortion is added is minimized and hence, a filter coefficient of the Volterra filter which forms the adaptive filter can be obtained as a time response of the inverse transfer function of the optical receiver 9 (step S304). The true inverse transfer function of the optical transmitter 7 can also be directly obtained by the adaptive equalization circuit and hence, step S303 and step S304 can be processed integrally in this case.

Next, an estimated true inverse transfer function of the optical receiver 9 is set in the receiver compensation section 11 (step S305). A setting method is equal to the setting method described in step S105. At this stage of processing, as described previously, setting of the true inverse transfer function can be independently performed with respect to the respective lanes XI, XQ, YI, and YQ. In this case, the delay difference between the lanes can also be extracted and compensated.

For the sake of brevity, in FIG. 1 to FIG. 5, the case is described where the receiver compensation section 11 compensates nonlinear distortion caused by the optical receiver 9 in the optical reception unit 3. However, in the embodiment of the present invention, provided that the receiver compensation section 11 is configured to compensate nonlinear distortion of a reception signal, the receiver compensation section 11 is not always necessary to compensate only nonlinear distortion. For example, the receiver compensation section 11 may include a filter such as an FIR filter which compensates linear distortion and a filter such as a Volterra filter which compensates nonlinear distortion. Further, for example, the receiver compensation section 11 may include a filter which simultaneously performs the compensation for linear distortion and the compensation for nonlinear distortion.

Figure 6:
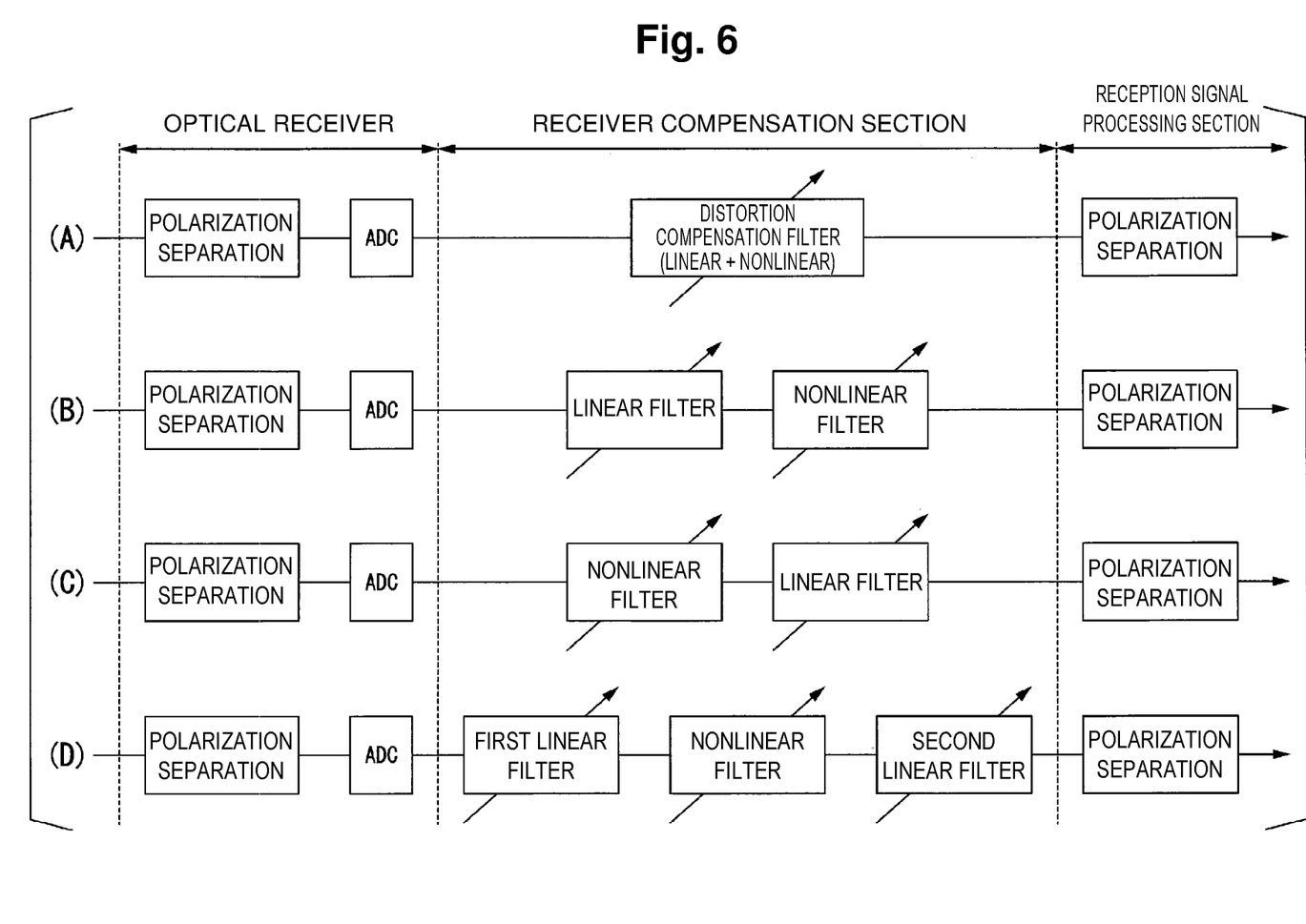
FIG. 6 is a view showing a specific example of the configuration of a receiver compensation section in a reception unit according to the embodiment of the present invention.

FIG. 6 is a view showing a specific example of the configuration of the receiver compensation section 11 in the optical reception unit 3 according to the embodiment of the present invention. In FIG. 6, the configuration (A) is a configuration where the receiver compensation section 11 includes a distortion compensation filter which simultaneously compensates linear distortion and nonlinear distortion. On the other hand, the configurations (B) and (C) are configurations where the receiver compensation section 11 includes a linear filter which compensates linear distortion and a nonlinear filter which compensates nonlinear distortion individually.

Specifically, the configuration (B) is the configuration which performs signal compensation processing sequentially in order of the linear filter and the nonlinear filter. In this case, a reception signal is compensated sequentially in order of linear distortion and nonlinear distortion. Accordingly, the configuration (B) is the configuration suitable for compensating a signal which has received distortion sequentially in the opposite order, that is, in the order of nonlinear distortion and linear distortion.

The configuration (C) is the configuration which performs signal compensation processing sequentially in order of the nonlinear filter and the linear filter opposite to the configuration (B). In this case, a reception signal is compensated sequentially in order of nonlinear distortion and linear distortion. Accordingly, the configuration (C) is the configuration suitable for compensating a signal which has received distortion sequentially in the opposite order, that is, in the order of linear distortion and nonlinear distortion.

The configuration (D) is the configuration which performs signal compensation processing sequentially in order of a first linear filter, a nonlinear filter, and a second linear filter by combining the configuration (B) and the configuration (C) to each other. In this case, a reception signal is compensated sequentially in order of linear distortion, nonlinear distortion and linear distortion. Accordingly, the configuration (D) is the configuration suitable for compensating a signal which has received distortion sequentially in the same order, that is, in the order of the linear distortion, the nonlinear distortion and the linear distortion.

As has been described with reference to FIG. 1, the optical receiver 9 according to the embodiment of the present invention performs processing of a signal sequentially in order of the polarization diversity 90° hybrid 9c, the PD (for example, a balanced photo diode) (not shown), and the trans-impedance amplifier (TIA) 9d. Accordingly, the reception signal receives nonlinear distortion caused by the TIA 9d after receiving linear distortion caused by the BPD. Accordingly, to compensate distortion caused by the optical receiver 9 according to the embodiment of the present invention, out of the above-mentioned configurations (A) to (D), it is desirable to adopt the configuration (A) which simultaneously compensates nonlinear distortion and linear distortion or the configuration (C) which sequentially compensates the nonlinear distortion and linear distortion.

Four filter configurations shown in FIG. 6 illustrate one example of the method of forming the receiver compensation section 11, and the configuration of the receiver compensation section 11 is not limited to any one of these four filter configurations. The filter configuration of the receiver compensation section 11 may be arbitrarily changed corresponding to a kind of distortion which a reception signal receives in the optical receiver 9 or the order that the reception signal receives distortions.

The receiver compensation section 11 has the filter configuration described above and hence, the receiver compensation section 11 can compensate linear distortion and nonlinear distortion of a reception signal. On the other hand, to compensate these distortions with high accuracy, it is necessary to set more accurate filter coefficients in the receiver compensation section 11. With respect to the compensation for linear distortion, a conventional compensation method which uses a linear filter such as an FIR filter can be used (for example, see Patent Literature 1). On the other hand, with respect to the compensation for nonlinear distortion, accuracy of estimation of a transfer function by a nonlinear filter such as a Volterra filter can be enhanced by adjusting a known signal which includes a reference signal used in estimating the transfer function.

More specifically, accuracy of estimation of the nonlinear filter can be enhanced by adjusting the order of a reference signal or a memory. Here, the order of a reference signal is the number of powers of a known signal used as a reference signal. For example, assuming a known signal sequence in time sequence as $S(t)=s_1, s_2, s_3, s_4, \ldots$, a third-order reference signal sequence can be defined as $S3,1(t)=s_1^3, s_2^3, s_3^3, s_4^3$. In this case, a reference signal at each point of time is expressed only by a known signal at the corresponding point of time, and does not depend on known signals in the past and in future with respect to the certain point of time. The reference signal in this case is expressed by the known signal at one corresponding point of time and hence, it is expressed that the reference signal sequence has one "memory". Symbol $S3,1(t)$ expresses the reference signal sequence which has the third order and one memory (hereinafter expressed as "third order+one memory".

On the other hand, the case where the number of memories of the reference signal is 2 or more means the case where a reference signal at a certain point of time includes known signals at two or more points of time in the past and in future with respect to the certain point of time. For example, the "third order+one memory" reference signal sequence based on the above-mentioned known signal sequence Sit) can be defined as $S3, 2(t)=s_1 \times s_2^2, s_2^2 \times s_3^2, s_3 \times s_4^2, s_4 \times s_5^2, \ldots$ as an example.

Figure 7:
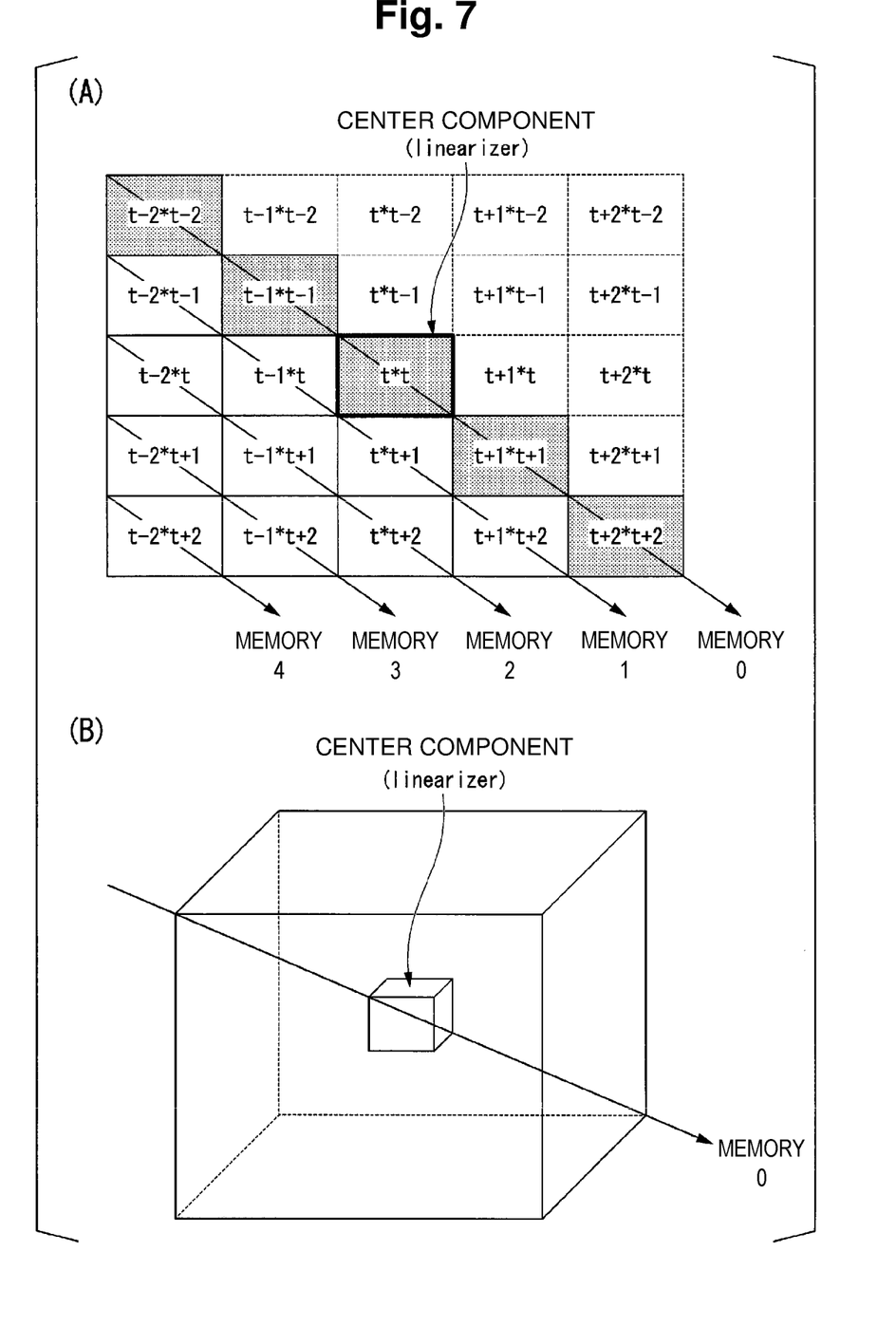
FIG. 7 is a view for describing a method of generating a reference signal in the embodiment of the present invention.

FIG. 7 is a view for describing a specific example of a method of generating a reference signal in the embodiment of the present invention. FIG. 7(A) is a matrix which expresses an image of a "second order+five memory" Volterra filter. The matrix expresses that the Volterra filter uses, in the estimation of a transfer function at a certain reference time t, known signals received at respective points of time from a point of time t−2 to a point of time t+2. Here, the point of time t−1 indicates a point of time which is before the point of time t by 1 unit time, and the point of time t+1 indicates a point of time which is after the point of time t by 1 unit time. In the same manner, the point of time t−2 indicates a point of time which is before the point of time t by 2 unit times, and the point of time t+2 indicates a point of time which is after the point of time t by 2 unit times. The multiplication of two points of time described in each cell of the matrix expresses a square power value of known signals corresponding to two points of time. For example, the description "(t−1)×(t+1)" in the cell expresses a multiplication value of a value of a known signal at the point of time t−1 and a value of a known signal at the point of time t+1. The adoption of the multiplication value of two known signals corresponding to two points of time as the reference signal corresponds to the setting of the order of the Volterra filter shown in FIG. 7 to second. Further, the matrix is symmetrical with respect to diagonal components and hence, the calculation of overlapping portions can be omitted in the calculation of the respective components.

In this manner, the Volterra filter can estimate a nonlinear response of the optical receiver 9 at a point of time t by expressing a transfer function at the point of time t using the values of known signals at the point of times other than the point of time t. In FIG. 7(A), for the same of brevity, an image view is provided for a second order Volterra filter. However, it is possible to constitute a third order Volterra filter by expanding the two-dimensional matrix shown in the drawing to a three-dimensional matrix shown in FIG. 7(B). Substantially the same expansion is also applicable to fourth order or more Volterra filters. The expression (1) expresses a Volterra filter having a third order+M (an integer of 1 or more) memory as an example of such a third order Volterra filter.

[Math. 1]

$$f_{volterra}(x(n)) = c_0 + \sum_{p_1=0}^{M-1} \sum_{p_2=0}^{M-1} \sum_{p_3=0}^{M-1} c_{p_1,p_2,p_3} x(n-p_1)x(n-p_2)x(n-p_3) \quad (1)$$

In the expression (1), symbol x indicates an input signal to the Volterra filter. Symbol $f_{volterra}(x)$ indicates an output signal of the Volterra filter, and also indicates an input signal X after the nonlinear distortion is compensated. Symbol $c_0$ indicates a constant, and symbols $c_{p1,p2,p3}$ indicate filter coefficients (also referred to as tap coefficients). In case of five memory (that is, M=5), $5^3$ pieces (that is, 125 pieces) of filter coefficients become necessary. In the same manner, in the second order Volterra filter having, $5^2$ pieces (that is, 25 pieces) of filter coefficients become necessary. These numbers correspond to the number of elements of the matrixes shown in FIG. 7(A) and FIG. 7(B).

There may be a case where the degrees of distributions of the respective reference signal values in the compensation for nonlinear distortion differ from each other depending on properties of distortions which are to be compensated. Accordingly, in such a case, instead of using all reference signal values included in the matrix, some reference signal values which exhibit high degree of contribution may be selectively used. This means that the nonlinear distortion is compensated by using some of coefficients of the Volterra filter. For example, only the center component (t×t) may be used, or only the diagonal components ((t−2)×(t−2), . . . , (t+2)×(t+2)) may be used. For example, the following expression (2) expresses the nth order Volterra filter which uses only the center component, and the following expression (3) expresses the nth order Volterra filter which uses only the diagonal components.

[Math. 2]

$$f(x) = c_0 + c_1 x + c_2 x^2 + c_3 x^3 + \cdots = \sum_{p=0}^{n} c_p x^p \quad (2)$$

[Math. 3]

$$f_{diagonal}(x(n)) = \\ c_0 + \sum_{p=1}^{N_1} c_p x_p(n-p) + \sum_{p=1}^{N_2} c_p x_p^2(n-p) + \sum_{p=1}^{N_3} c_p x_p^3(n-p) + \cdots \quad (3)$$

Figure 8:
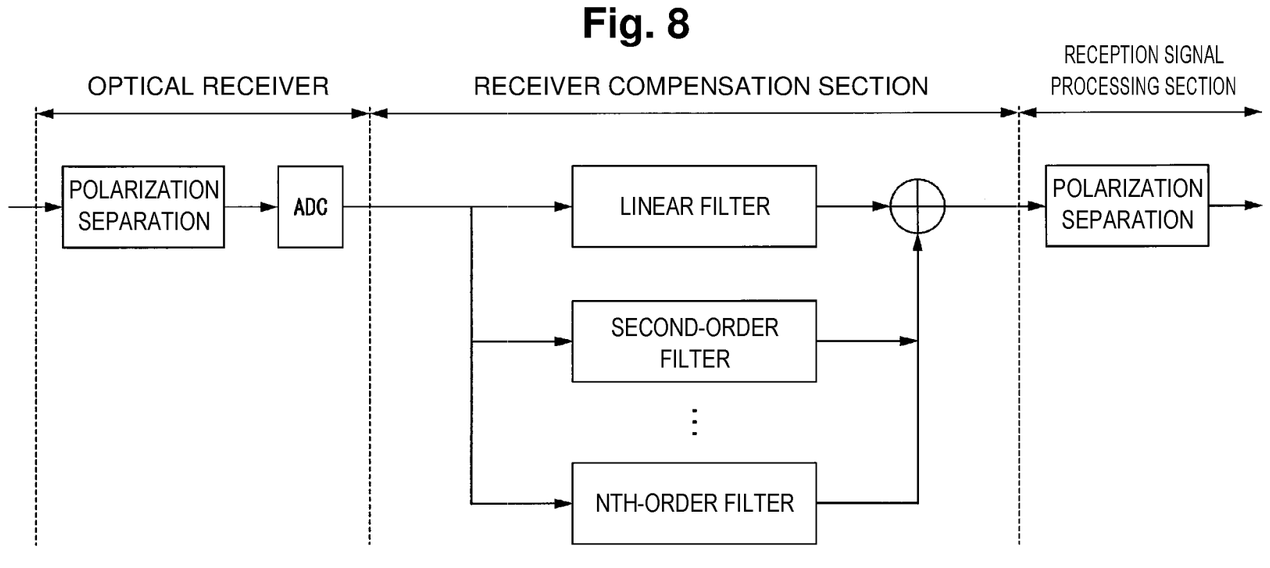
FIG. 8 is a view showing a specific example of the configuration of a Volterra filter which uses only diagonal components in the embodiment of the present invention.

That is, the Volterra filter which uses only the center component corresponds to the approximation of a compensated signal by performing Taylor series of an input signal, and such a Volterra filter is also called a linearizer particularly. On the other hand, in the Volterra filter which uses only diagonal components, as in a case of an FIR filter, a frequency characteristic (also referred to as a time delay characteristic) can be expressed corresponding to tap numbers of respective x terms of first and more orders. The Volterra filter which uses only the diagonal components is also referred to as a generalized memory polynomial model. FIG. 8 is a view showing a specific example of the configuration of a Volterra filter which uses only such diagonal components. The linear filter, the second order filter, and the nth order filter in the receiver compensation section 11 shown in FIG. 8 are not adaptive filters where a coefficient is changed suitably corresponding to a change in response characteristic with time, but are stationary filters where coefficients are set as fixed values. In general, a frequency characteristic of the optical receiver 9 differs between a low frequency band and a high frequency band and hence, the expression (3) which expresses frequency characteristics can compensate the nonlinear distortion more accurately than the expression (2).

In this manner, in case of compensating nonlinear distortion having a strong pattern effect (that is, high dependency on a pattern of an input signal sequence), a Volterra filter which handles larger memories is formed. On the other hand, in case of compensating nonlinear distortion having strong band dependency (that is, strong time delay characteristic), a Volterra filter which handles larger diagonal components is formed. With such processing, it is possible to compensate the nonlinear distortion of an input signal with higher accuracy. In this case, the reference signal may be formed so as to include known signals which the Volterra filter handles.

Figure 9:
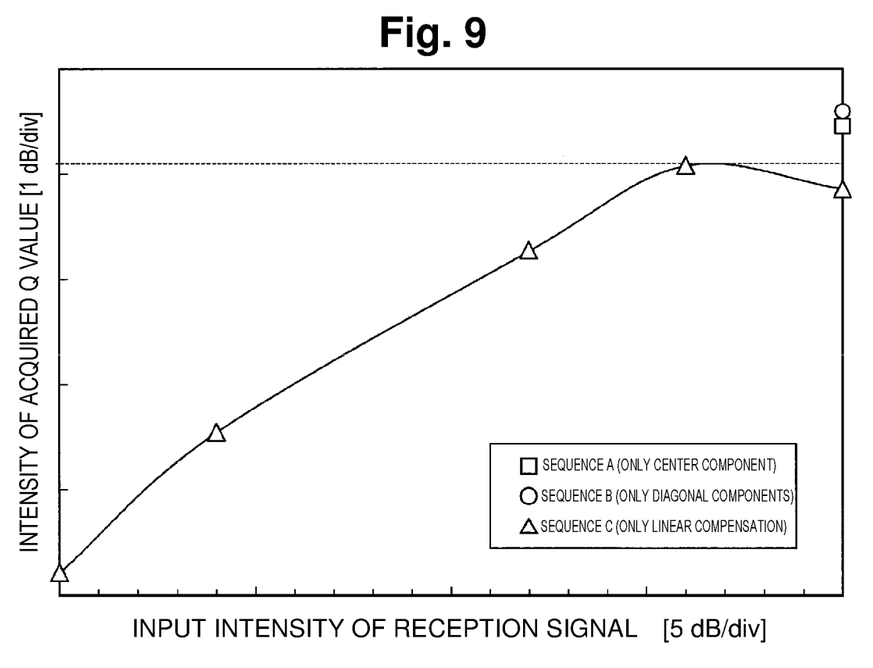
FIG. 9 is a view showing an example of an advantageous effect acquired by the optical transmission system according to the embodiment of the present invention.

FIG. 9 is a view showing an example of an advantageous effect acquired by the optical transmission system 100 according to the embodiment of the present invention. In FIG. 9, a sequence A shows a result of an experiment where a reception signal is compensated by a Volterra filter which uses only the center component, a sequence B shows a result of an experiment where a reception signal is compensated by a Volterra filter which uses only the diagonal components. Further, a sequence C shows a result of an experiment where a reception signal is compensated only by a linear filter. In the drawing, input intensity of the reception signal is taken on an axis of abscissas, and intensity of a Q value restored from an output signal of the filter is taken on an axis of ordinates. Common conditions shared by the experiments of the respective sequences are that a baud rate is 64 GBd, a modulation system is a polarization division multiplexing-64 quadrature amplitude modulation (PDM-64QAM), and there is no load caused by noises.

As a result, with respect to the sequence A, the output intensity of the Q value is increased by approximately 0.37 [dB] compared to the optimized result of the experiment in the sequence C (only the linear compensation). Further, with respect to the sequence B, the output intensity of the Q value is increased by approximately 0.51 [dB] compared to the optimized result of the experiment in the sequence C (only the linear compensation).

According to the optical transmission system 100 of the embodiment having the above-mentioned configuration, in the optical receiver, it is possible to estimate a nonlinear response caused by the internal configuration, and it is possible to compensate distortion of a transmission characteristic caused by the nonlinear response. Accordingly, in the optical transmission system 100, it is possible to realize a favorable transmission characteristic in a broad band.

<Modification>

The receiver compensation section 11 may be configured such that a reception signal is compensated by using a lookup table generated based on a transfer function of the optical receiver 9 estimated by the receiver transfer function estimation section 13. The lookup table is information expressing a correspondence relationship between an input and an output of the transfer function. More specifically, in the lookup table, a discrete value of an input signal and a discrete value of an output signal of a transfer function with respect to the input signal are made to correspond to each other. By preparing the lookup table in advance, an arithmetic calculation amount of the receiver compensation section 11 can be reduced. For example, the lookup table may be generated based on a transfer function to which a filter coefficient estimated by a linear analyzer is applied.

The optical transmission system 100 according to the embodiment may be configured as a system which is dedicated to adjustment where the optical transmitter 7 or the optical receiver 9 is adjusted before a service is offered to a user. The optical transmission system 100 may be configured as a system which adjusts the optical transmitter 7 or the optical receiver 9 while offering a service to a user. For example, a reference signal sequence (also referred to as a training signal sequence) is periodically transmitted to the optical transmission unit 1, and the optical reception unit 3 is made to estimate a transfer function in response to reception of a reference signal sequence. With such processing, even during a period where the optical transmission system 100 is being operated, it is possible to adjust the optical transmitter 7 or the optical receiver 9. In a case where a timing at which a service is not offered (hereinafter referred to as "non-operation period") exists in the optical transmission system 100, the optical transmission unit 1 and the optical reception unit 3 may be configured to perform transmission and reception of the reference signal sequence during the non-operation period instead of the operation period.

For example, in a case where the optical reception unit 3 has a function of observing a predetermined phenomenon relating to an AEQ tap, a frequency offset compensation amount, a phase compensation amount or a demodulated transmission data (hereinafter referred to as "a trigger function"), the receiver transfer function estimation section 13 may be configured to estimate a transfer function when the above-mentioned predetermined phenomenon is observed. For example, in this case, the receiver transfer function estimation section 13 estimates amounts of various kinds of errors caused by factors other than a nonlinear response of the optical receiver 9 based on respective compensation amounts other than nonlinear distortion, and generates a temporary signal including the errors other than the nonlinear distortion by overlapping the respective estimated error amounts to a signal which becomes the reference. Then, the receiver transfer function estimation section 13 can estimate a coefficient of the nonlinear filter by comparing the temporary signal generated in this manner and a reception signal which still includes the nonlinear distortion with each other. With such a configuration, it is unnecessary to transmit a reference signal sequence which aims at the compensation for the nonlinear distortion and hence, it is possible to avoid the decrease of a band caused by transmission of the reference signal sequence.

A part or all of the optical transmission unit 1 and the optical reception unit 3 according to the above-mentioned embodiments may be realized by a computer. In this case, the part or all of the optical transmission unit 1 and the optical reception unit 3 may be realized such that a program for realizing such functions may be stored in a computer readable recording medium, and a computer system may be made to read the program stored in the recording medium and to execute the program. Here, "computer system" includes hardware such as an OS and peripheral equipment. Also, "computer readable recording medium" means a portable medium such as a flexible disc, a magneto optical disc, a ROM or a CD-ROM or a recording device such as a hard disk incorporated in the computer system. Further, "computer readable recording medium" may include: an element which dynamically holds a program for a short period of time such as a communication line when the program is transmitted through a network such as the Internet or a communication line such as a telephone line; and an element which holds a program for a fixed period of time such as a volatile memory in a computer system which becomes a server or a client in such a case. The program may be a program which is provided for realizing a part of the above-mentioned function, or may be a program which can realize the above-mentioned functions in combination with a program already recorded in a computer system. The program may be a program which can be realized by using a programmable logic device such as a field programmable gate array (FPGA).

Although the embodiment of the present invention has been described heretofore with reference to drawings, the specific configurations are not limited to this embodiment, and the present invention also includes designs which do not depart from the gist of the present invention.

INDUSTRIAL APPLICABILITY

The present invention is applicable to a device which estimates a transmission characteristic of an optical receiver in the optical transmission system.

REFERENCE SIGNS LIST

100 optical transmission system
1 optical transmission unit
2 transmission path
3 optical reception unit
4 transmission signal processing section
5 known signal insertion section
6 transmitter compensation section
7 optical transmitter
7a driver amplifier
7b laser module
7c synthesizer
7d polarization synthesizer
8 transmitter transfer function estimation section
9 optical receiver
9a polarization separator
9b laser module
9c polarization diversity 90° hybrid
9e converter
10 data buffer
11 receiver compensation section
12 reception signal processing section
13 receiver transfer function estimation section

The invention claimed is:

1. An optical transmission system comprising:
an optical transmission unit configured to modulate an optical signal into which a known signal is inserted and to transmit the optical signal; and
an optical reception unit configured to receive the optical signal from the optical transmission unit, wherein
the optical reception unit includes:
an optical receiver configured to perform coherent detection of a reception signal of the optical signal received from the optical transmission unit;
a receiver transfer function estimation section configured to estimate a nonlinear response transfer function of the optical receiver based on the known signal included in the reception signal after the detection by the optical receiver; and
a receiver compensation section configured to compensate nonlinear distortion of the optical signal after the detection based on the nonlinear response transfer function which the receiver transfer function estimation section estimates;
wherein the receiver transfer function estimation section is configured to further estimate a linear response transfer function of the optical receiver based on the reception signal after the detection by the optical receiver, and the receiver compensation section is configured to compensate linear distortion of the reception signal after the detection based on the linear response transfer function which the receiver transfer function estimation section estimates in addition to compensation for the nonlinear distortion.

2. The optical transmission system according to claim 1, wherein the receiver transfer function estimation section is configured to estimate a first transfer function of the optical receiver based on an output signal of the optical receiver with respect to input of an amplified spontaneous emission (ASE) signal, the optical transmission unit further includes a transmitter transfer function estimation section configured to estimate a transfer function of the optical transmitter which modulates the optical signal based on a reception signal which includes a known signal and the first transfer function, and the receiver transfer function estimation section is configured to estimate a second transfer function of the optical receiver based on a reception signal which includes the known signal and in which distortion caused by the optical transmitter is compensated and the transfer function of the optical transmitter, and the receiver compensation section is configured to compensate nonlinear distortion of the reception signal after the detection based on the second transfer function.

3. The optical transmission system according to claim 1, wherein the receiver compensation section is configured to compensate the linear distortion and the nonlinear distortion of the reception signal in an order opposite to an order that the reception signal receives the linear distortion and the nonlinear distortion in the optical receiver.

4. The optical transmission system according to claim 1, wherein the receiver compensation section is configured to compensate nonlinear distortion of the reception signal by using a Volterra filter.

5. The optical transmission system according to claim 4, wherein the receiver compensation section is configured to compensate nonlinear distortion of the reception signal by using some of coefficients of the Volterra filter.

6. The optical transmission system according to claim 4, wherein the receiver transfer function estimation section is configured to estimate the nonlinear response transfer function by using a component which corresponds to intensity of band dependency or a pattern effect of the nonlinear response out of reference signal components which form the Volterra filter.

7. A compensation method of a reception signal in an optical transmission system which includes an optical transmission unit which modulates an optical signal into which a known signal is inserted and transmits the optical signal, and an optical reception unit which receives the optical signal from the optical transmission unit, the compensation method comprising the steps, by the optical reception unit, of:

performing coherent detection of a reception signal of the optical signal received from the optical transmission unit by an optical receiver;

estimating a nonlinear response transfer function of the optical receiver based on the known signal included in the reception signal after the detection by the optical receiver;

compensating nonlinear distortion of the reception signal after the detection based on the estimated nonlinear response transfer function;

estimating a linear response transfer function of the optical receiver based on the reception signal after the detection by the optical receiver; and compensating linear distortion of the reception signal after the detection based on the linear response transfer function.

8. An optical transmission system comprising:

an optical transmission unit configured to modulate an optical signal into which a known signal is inserted and to transmit the optical signal; and an optical reception unit configured to receive the optical signal from the optical transmission unit, wherein the optical reception unit includes:

an optical receiver configured to perform coherent detection of a reception signal of the optical signal received from the optical transmission unit;

a receiver transfer function estimation section configured to estimate a nonlinear response transfer function of the optical receiver based on the known signal included in the reception signal after the detection by the optical receiver; and a receiver compensation section configured to compensate nonlinear distortion of the optical signal after the detection based on the nonlinear response transfer function which the receiver transfer function estimation section estimates;

wherein the receiver transfer function estimation section is configured to estimate a first transfer function of the optical receiver based on an output signal of the optical receiver with respect to input of an amplified spontaneous emission (ASE) signal, the optical transmission unit further includes a transmitter transfer function estimation section configured to estimate a transfer function of the optical transmitter which modulates the optical signal based on a reception signal which includes a known signal and the first transfer function, the receiver transfer function estimation section is configured to estimate a second transfer function of the optical receiver based on a reception signal which includes the known signal and in which distortion caused by the optical transmitter is compensated and the transfer function of the optical transmitter, and the receiver compensation section is configured to compensate nonlinear distortion of the reception signal after the detection based on the second transfer function.

* * * * *